US006560517B2

(12) United States Patent
Matsui

(10) Patent No.: US 6,560,517 B2
(45) Date of Patent: May 6, 2003

(54) VEHICLE MANAGEMENT SYSTEM AND METHOD THEREOF

(75) Inventor: Fujio Matsui, Tokyo (JP)

(73) Assignee: Fuji Jukgyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/995,189

(22) Filed: Nov. 26, 2001

(65) Prior Publication Data

US 2002/0065590 A1 May 30, 2002

(30) Foreign Application Priority Data

Nov. 30, 2000 (JP) ....................................... 2000-364726

(51) Int. Cl.[7] ............................................... G01M 17/00
(52) U.S. Cl. ............................. 701/33; 701/29; 701/36; 370/349
(58) Field of Search ............................. 701/33, 29, 30, 701/36; 370/349, 315, 459; 340/436, 438, 903

(56) References Cited

U.S. PATENT DOCUMENTS 5,758,300 A * 5/1998 Abe ............................ 701/35
5,850,209 A * 12/1998 Lemke et al. ............... 345/156
6,084,870 A * 7/2000 Wooten et al. .............. 370/349
6,128,501 A * 10/2000 Ffoulkes-Jones ............ 455/456
6,340,928 B1 * 1/2002 McCurdy .................... 340/436
6,366,840 B1 * 4/2002 Buckley ...................... 701/36

FOREIGN PATENT DOCUMENTS

JP 64-052552 2/1989 ........... B60R/16/02

* cited by examiner

*Primary Examiner*—William A Cuchlinski, Jr.
*Assistant Examiner*—Marthe Y. Marc-Coleman
(74) *Attorney, Agent, or Firm*—Darby & Darby

(57) ABSTRACT

In a vehicle management system, a user uses a portable telephone dedicated to the own vehicle to enter a specific number that is pre-set for the portable telephone. This automatically brings a control apparatus incorporated in a vehicle to a standby state for wireless communication. The control apparatus calls a central information management center. Data stored in control apparatuses interconnected over a network within the vehicle is transmitted to the central information management center through the portable telephone. The central information management center preserves vehicle information in one-to-one correspondence with users, and distributes the data to departments. The condition of each vehicle is thus managed. Moreover, information concerning the condition of a vehicle, such as, the maintained state of a vehicle and the presence or absence of a defect is provided for each user.

8 Claims, 2 Drawing Sheets

VEHICLE MANAGEMENT SYSTEM AND METHOD THEREOF

This application claims benefit of Japanese Application No. 2000-364726 filed on Nov. 30, 2000, the contents of which are incorporated by this reference.

BACKGROUND OF THE INVENTION

1. Field of the Invention

The present invention relates to a vehicle management system capable of managing the conditions of each user's vehicle in real time.

2. Description of the Related Art

In recent years, it has become a matter of common practice to adopt a failure diagnosis system, which can read data from an electronic control apparatus mounted on a vehicle, for the purpose of failure diagnosis for automobiles and other vehicles. This type of failure diagnosis system includes, for example, a failure diagnosis system disclosed in Japanese Patent No. 1995-15427 (Japanese Examined Patent Application Publication No. 7-15427) filed by the present applicant. In the failure diagnosis system, data stored in the on-vehicle electronic control apparatus is read into the failure diagnosis system or an external computer which is connected to the failure diagnosis system and in which an expert system is installed. The data includes detection signals generated at sensors and switches and stored in the on-vehicle electronic control apparatus, control signals to be transmitted to actuators including fuel injectors, and data calculated in the system. Defective components or causes of failure are explored and required repair or adjustment is carried out.

However, the conventional failure diagnosis system is supposed to be used at the time of regular inspection or when a vehicle actually fails, and limited to a specific use frequency and use site. It is therefore hard to grasp the time-passing changes of components of a vehicle occurring under the requirements for actual daily use by a user so as to manage the condition of the vehicle. It is hard to take preventive measures against failure before occurrence.

SUMMARY OF THE INVENTION

Accordingly, an object of the present invention is to provide a vehicle management system for managing in real time the condition of each user's vehicle so as to improve efficiency of preventive maintenance and safety, and for providing information concerning the condition of a vehicle to each user.

Briefly, according to the present invention, there is provided a vehicle management system including a dedicated vehicle data communicating means that can transmit data, which is stored in a control apparatus mounted on each user's vehicle, to outside in real time by radio. When the vehicle data communicating means transmits data, which is stored in the on-vehicle control apparatus, by radio, the data is preserved in correspondence with each user's vehicle. The condition of the vehicle is thus managed, and information concerning the condition of a vehicle is provided for each user.

Other features of the present invention and the advantages thereof will be fully apparent from the description below.

DESCRIPTION OF THE PREFERRED EMBODIMENTS

Figure 1:
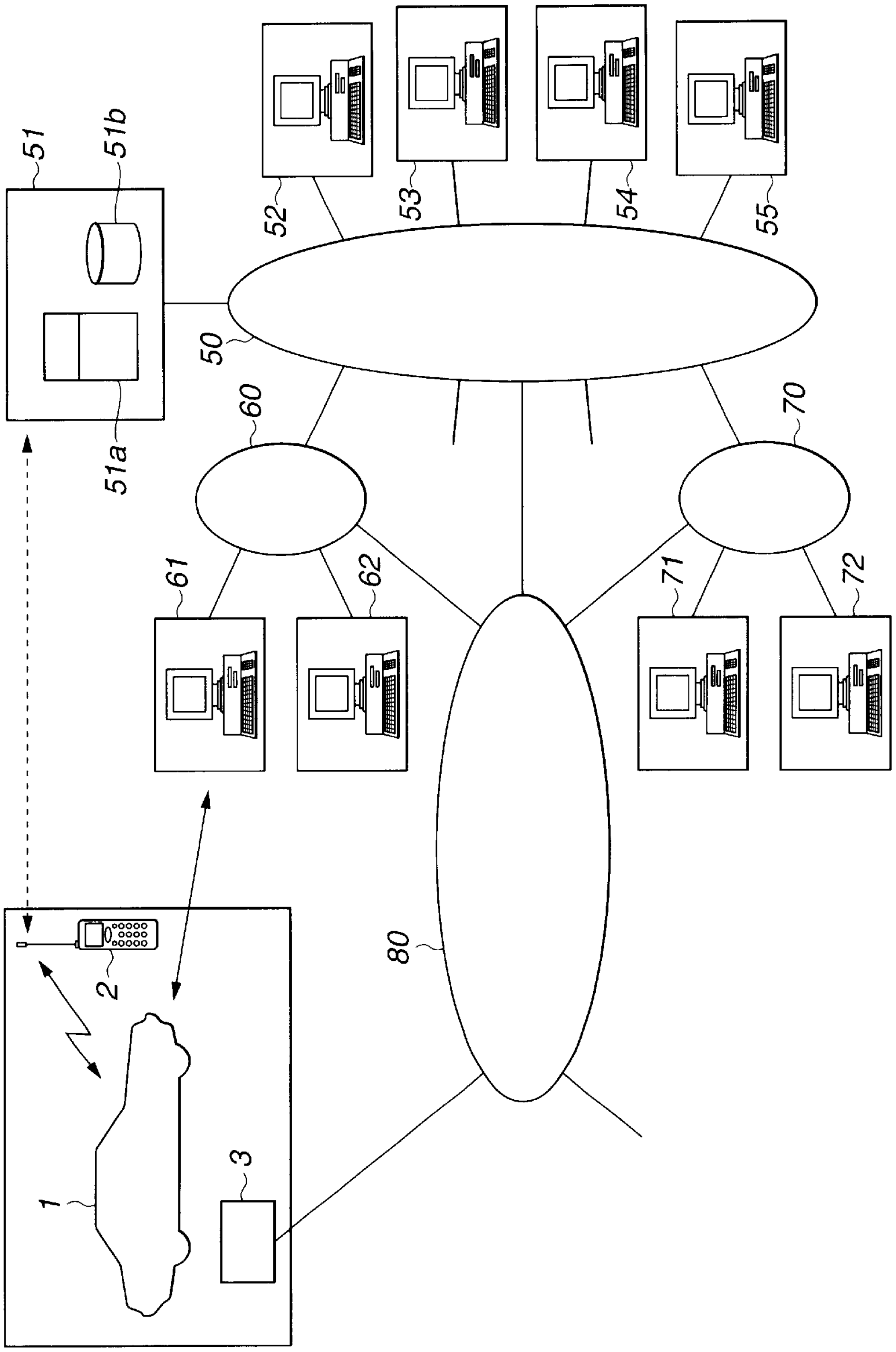
FIG. 1 shows the overall configuration of a vehicle management system.

A vehicle management system shown in FIG. 1 manages the condition of each user's vehicle 1, which has been sold, around the clock in real time, and provides the latest own vehicle information (condition) for the user. The vehicle management system accommodates a radiocommunication terminal 2, which serves as a dedicated vehicle data communicating means, in association with each user's vehicle 1. The radiocommunication terminal 2 can communicate data (own vehicle information), which is stored in an on-vehicle control apparatus, to outside in real time by radio. The own vehicle information is transmitted to a central information management center 51 via the radiocommunication terminal 2, and preserved in the form of a database 51*b* in a host computer 51*a*.

A movable body radiocommunication system accommodating base stations that are not shown can be utilized for data communication between each user's vehicle 1 and the central information management center 51. Moreover, a communication terminal connected to an on-vehicle control apparatus over a harness may be adopted as the radiocommunication terminal 2 that transmits own vehicle information concerning each user's vehicle 1. Preferably, the radiocommunication terminal 2 is a compact communication terminal that can be separated from the vehicle 1 and can be used as a portable terminal for communicating with the on-vehicle control apparatus by wireless. According to the present embodiment, a dedicated portable telephone in which a communication circuit that communicates with the on-vehicle control apparatus by wireless is adopted as the portable communication terminal. A description will proceed on the assumption that the radiocommunication terminal 2 is a portable telephone. Incidentally, when a user already owns a portable telephone, a communication terminal that is connected to the user's portable telephone in order to transmit data will do.

Figure 2:
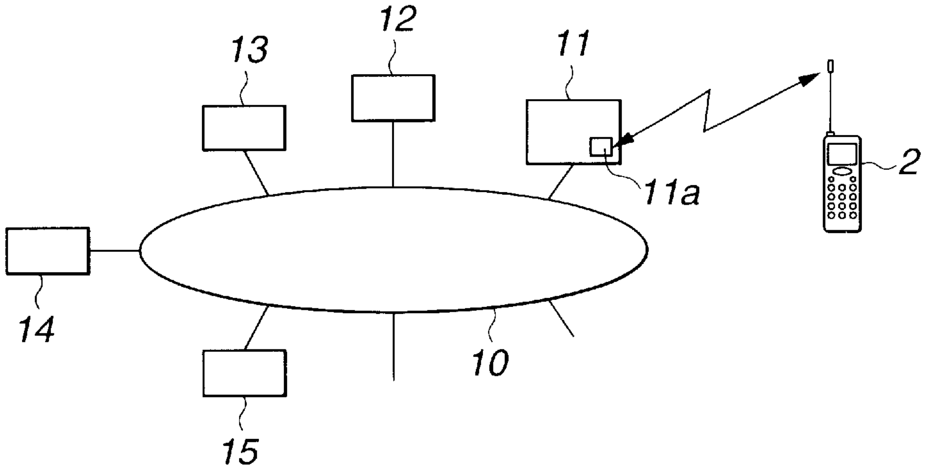
FIG. 2 is an explanatory diagram showing a network that accommodates vehicles.

According to the present embodiment, data concerning the vehicle 1 is transmitted to the central information management center 51 via the portable telephone 2. If only one control apparatus is mounted on the vehicle 1, a communication circuit for controlling wireless communication with the portable telephone 2 is incorporated in the control apparatus. If a plurality of control apparatuses, for example, as shown in FIG. 2, control apparatuses 11, 12, 13, 14, 15, etc. are mounted on the vehicle 1, the control apparatuses 11, 12, 13, 14, 15, etc. are preferably interconnected over a network 10 in order to unify control information. A communication circuit 11*a* for controlling wireless communication with the portable telephone 2 is incorporated in a predetermined one of the control apparatuses interconnected over the network 10, for example, the control apparatus 11. The network 10 is a network for vehicles that is suitable for real-time control of wireless communication. Moreover, a wireless communication method to be adopted for communication with an on-vehicle control apparatus is, for example, a communication method based on the Bluetooth standard that is widely adopted for near-distance wireless communication.

The central information management center 51 is, as shown in FIG. 1, connected to a plurality of departments over a dedicated network 50. The plurality of departments includes a development department 52, a software development environment department 53, a sales/service department 54, and an inspection/quality assurance department 55, etc. Dedicated networks 60, 70, etc. each of which accommodates local dealers or the like are connected to the dedicated network 50. Service tools 61, 71, etc. and sales tools 62, 72, etc. are interconnected over the networks 60, 70, etc. This results in a vehicle management system enabling practical diagnosis or repair of each vehicle 1 according to management information preserved in the central information management center 51. Furthermore, the dedicated networks 50, 60, 70, etc. are interconnected over the Internet 80 that is a general public network. Information can be provided for each user via not only the portable telephone 2 but also each user's personal computer 3.

In the foregoing vehicle management system, as long as each user's vehicle 1 is in operation, a user can transmit own vehicle information to the central information management center 51 any time irrespective of whether the user's vehicle 1 is stopped or traveling. Specifically, when the user wants to learn the condition of the own vehicle 1, the user uses the portable telephone 2 dedicated to the vehicle 1 to transmit vehicle information to the central information management center 51. The user can then receive information concerning the condition of the vehicle, that is, concerning the maintained state of the own vehicle or the presence or absence of trouble.

In order to transmit vehicle information of each own vehicle 1 to the information management center 51, a user uses the portable telephone 2 dedicated to the vehicle 1 to enter a specific number that is pre-set for the portable telephone 2. This automatically brings the control apparatus 11 on the vehicle 1 to a standby state for wireless communication. Moreover, the central information management center 51 is called. When a connection between the portable telephone 2 and central information management center 51 is established, data acquired by the control apparatuses interconnected over the network 10 within the vehicle 1 is transmitted to the portable telephone 2. At this time, the communication circuit 11*a* incorporated in the control apparatus 11 appends a user identification code or the like to the data. The data is then transmitted to the central information management center 51 through the portable telephone 2.

Figure 3:
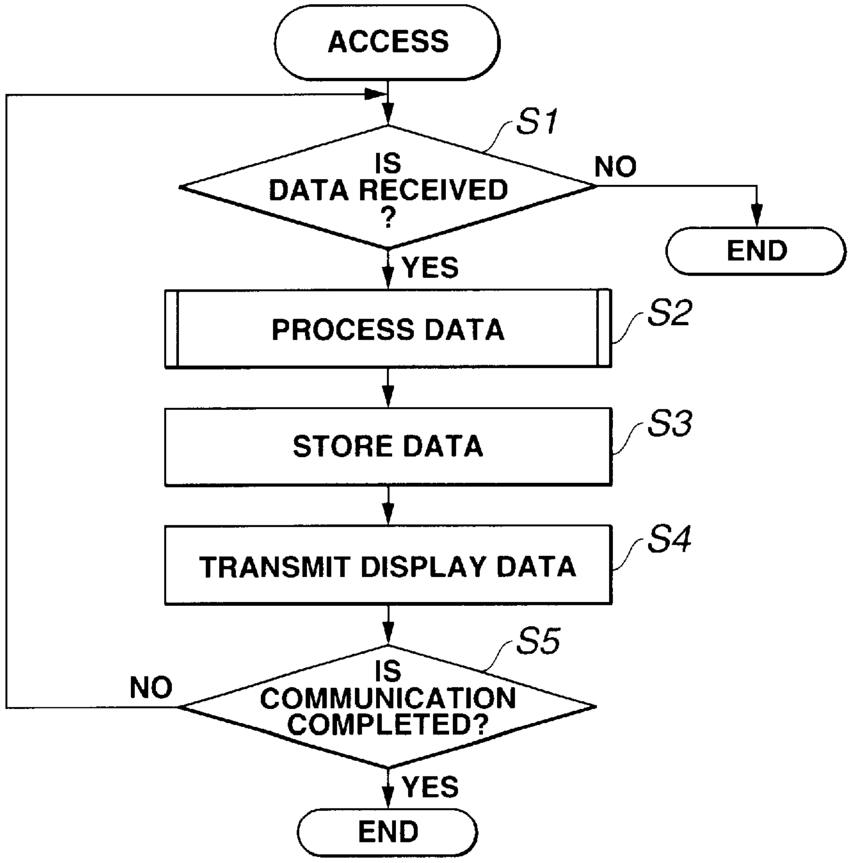
FIG. 3 is a flowchart describing communication of vehicle information to or from a central information management center.

If the user's portable telephone 2 accesses the central information management center 51, a host computer 51*a* acts as described in the flowchart of FIG. 3. Specifically, first, the host computer 51*a* checks at step S1 whether data is being received or not. If data is not being received, a routine is escaped. If data is being received, control is passed to step S2. The host computer 51*a* then processes received data and preserves the data at step S3. For example, the host computer 51*a* processes received data according to a user identification code, a type of vehicle, conditions for control (mileage and conditions for traveling), a kind of data (control data, learning data, self-diagnosis data, etc.), a type of apparatuses or components such as sensors or actuators. The host computer 51*a* then preserves processed data in the form of the database 51*b*.

Control is then passed to step S4. The host computer 51*a* transmits display data to be displayed on the user's portable telephone 2. The display data is, for example, a message saying that data is being transmitted from the portable telephone 2 to the central information management center 51. Otherwise, the display data is a message notifying the kind of data being transmitted from the portable telephone 2, or a message reporting the progress of reception by the central information management center 51. Control is then passed to step S5. The host computer 51*a* then checks if communication is completed. If communication is not completed, control is returned to step S1 and the aforesaid steps are repeated. If communication is completed, the routine is escaped.

Vehicle information concerning each user's vehicle preserved in the central information management center 51 is distributed to the departments over the network 50, whereby the condition of the vehicle is managed and various services are provided. For example, in the development department 52, each responsible section acquires information of the operation frequency of each component of a user's vehicle, evaluates a control algorithm, diagnoses the condition of the vehicle in real time, copes with a defect, predicts troubles by grasping a time-sequential change of each component, or diagnoses a defect that can hardly be reproduced. In the software development environment department 53, each responsible section improves the control algorithm or acquires information needed to develop an unprecedented product.

In the sales/service department 54 that provides services for users, each responsible section diagnoses each user's vehicle 1 before receiving the vehicle as a service vehicle or reports a user that the user's vehicle has been received as a service vehicle in order to perform periodical inspection. The sales/service department 54 distributes information to dealers or the like and instructs the dealers to perform inspection or diagnosis using the service tools 61 at the dealers. In the inspection/quality assurance department 55, each responsible section evaluates absolutely the quality of each component on the market, collects real-time raw statistical data, or evaluates relatively the quality of each component produced by each manufacture. The results of the evaluations are fed back to the departments.

Information on the result of data analysis concerning each user's vehicle or the result of diagnosis of the vehicle, which is obtained at each department, is returned to the central information management center 51 and preserved as history information in relation to each user. Moreover, the information is provided for each user via a home page of the web site on the Internet 80 or the portable telephone 2. Specifically, each user merely accesses the home page of the web site on the Internet 80 using the own personal computer 3 or portable telephone 2, and enters his/her own identification number, name, password and the like. The user can read his/her own vehicle information.

Consequently, all that a user has to do is to transmit the data of the own vehicle 1 to the central information management center 51 by manipulating the portable telephone 2. The user is relieved of the bother of daily inspection or temporal restrictions. The user can receive the advanced and accurate diagnosis services provided by the relevant departments at a small charge for communication. The user can thus avoid occurrence of a failure. Moreover, if the user transmits the condition of the vehicle to the central information management center 51 in advance, almost all inspection items included in regular inspection can be completed by the time when the vehicle is actually put into a service station of a dealer. Both the user and dealer can save time and costs.

If the vehicle 1 should fail, the user transmits the data of the vehicle 1 using the dedicated portable telephone 2. The user can thus learn the degree of the failure. Even if the vehicle should be repaired urgently, the user can receive a guidance service about the route to the service station located nearest to the current position using a navigation system mounted on the vehicle. Furthermore, when an insignificant defect that poses no problem in safety of running and is not reproducible occurs, it is conventionally hard to find the cause quickly. When the user transmits vehicle driving data, which is acquired during actual traveling, to the central information management center 51 using the dedicated portable telephone 2, the user can find the cause quickly.

As described so far, the vehicle management system in accordance with the present invention can manage the condition of each user's vehicle in real time so as to improve efficiency in preventive maintenance and safety. Moreover, the vehicle management system can provide information of the condition of each user's vehicle for each user.

According to the present invention, it is apparent that a wide range of embodiments can be formed based on the invention without a departure from the spirit and scope of the invention. The present invention is limited to the appended claims but not restricted to any specific embodiment.

What is claimed is:

1. A vehicle management system for controlling a maintenance condition of a user's vehicle having a network of a plurality of control apparatuses mounted on said vehicle for controlling various operating conditions thereof and for storing data of said operating conditions and a central information management center connected to various support departments for allowing the support departments to communicate with each other, comprising:

a vehicle data communicating means dedicated to said vehicle for exclusively and wirelessly transmitting said data from said vehicle to said central information management center in real time;

a database system included in said central information management center for individually storing said data; and a network system connected to said central information management center and said support departments respectively so as to effectively check whether or not said vehicle is being operated in a normal condition and to feed back results thereof to each user before a malfunction occurs in said vehicle.

2. The vehicle management system according to claim 1, further comprising:

a communication circuit for wirelessly communicating with said vehicle data communicating means and at least one of said control apparatuses;

wherein said data in said control apparatuses is transmitted to said vehicle data communicating means through wireless communication.

3. The vehicle management system according to claim 2, wherein said vehicle data communicating means is a portable telephone having the ability to wirelessly communicate with one of said control apparatuses including said communication circuit.

4. A vehicle management system according to claim 2, wherein said vehicle data communicating means is connected to a user's portable telephone in order to transmit data via said portable telephone.

5. The vehicle management system according to claim 1, wherein said vehicle data communicating means is connected to at least one of said control apparatuses over a harness.

6. A vehicle management system according to claim 5, wherein said vehicle data communicating means is connected to a user's portable telephone in order to transmit data via said portable telephone.

7. A vehicle management system according to claim 1, wherein information concerning the condition of the vehicle is provided over a general public network.

8. A vehicle management method for controlling a maintenance condition of a user's vehicle having a network of a plurality of control apparatuses mounted on said vehicle for controlling various operating conditions thereof and for storing data of said operating conditions and a central information management center connected to various support departments for allowing the support departments to communicate with each other, comprising the steps of:

dedicating a vehicle data communicating means to said vehicle for exclusively and wirelessly transmitting said data from said vehicle to said central information management center in a real time method;

including a database system in said central information management center for individually storing said data; and connecting a network system to said central information management center and said support departments respectively so as to effectively check whether or not said vehicle is being operated in a normal condition and to feed back results thereof to each user before a malfunction occurs in said vehicle.

* * * * *